Figure 1:
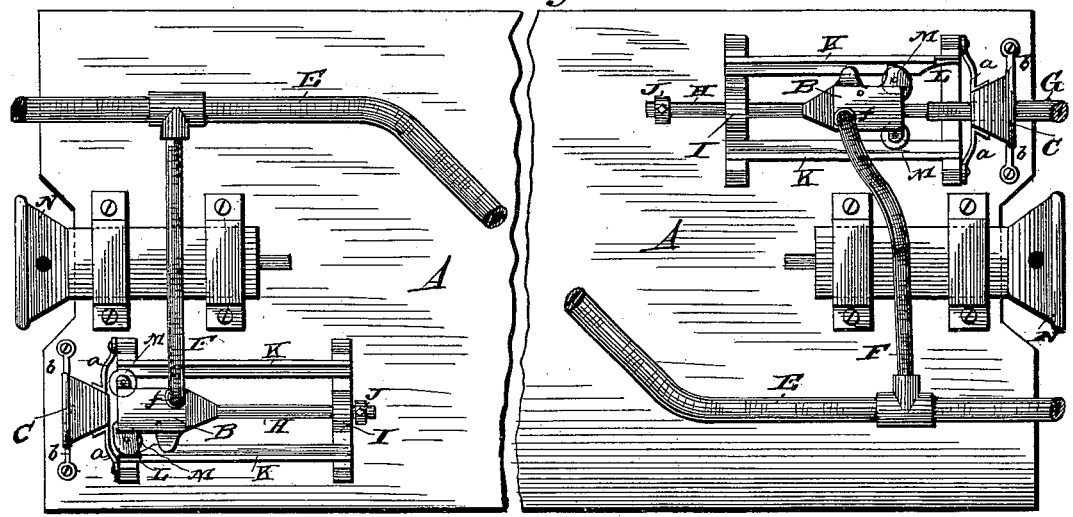

(No Model.) 2 Sheets—Sheet 1.

P. G. ROQUEMORE.
AUTOMATIC AIR BRAKE COUPLING.

No. 407,839. Patented July 30, 1889.

WITNESSES
Phil C. Dietrich.
E. Cruse

INVENTOR
Peter G. Roquemore
per O. E. Duff,
Attorney (No Model.) 2 Sheets—Sheet 2.
P. G. ROQUEMORE.
AUTOMATIC AIR BRAKE COUPLING.
No. 407,839. Patented July 30, 1889.
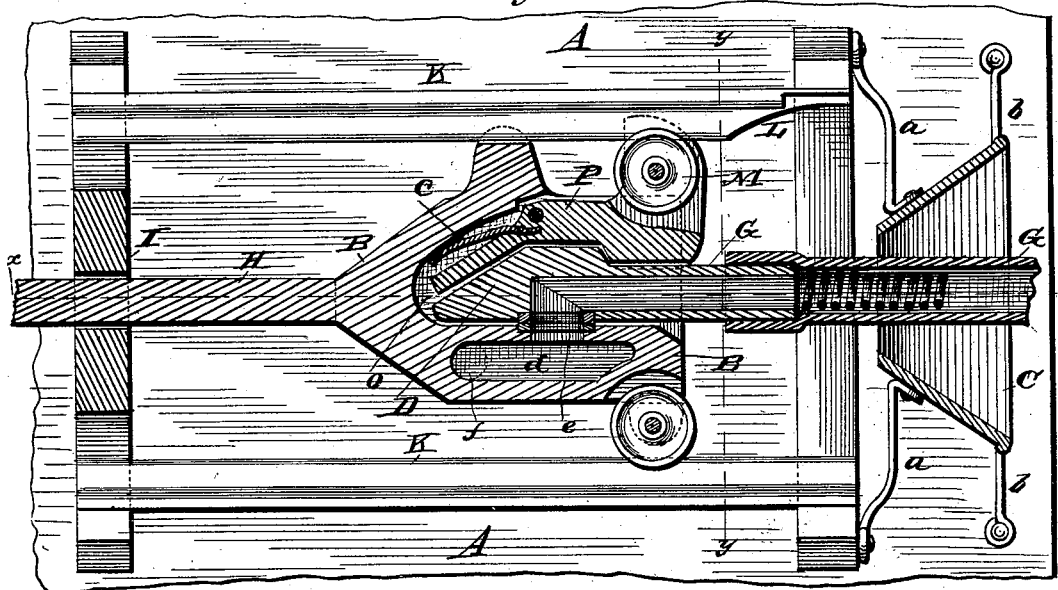
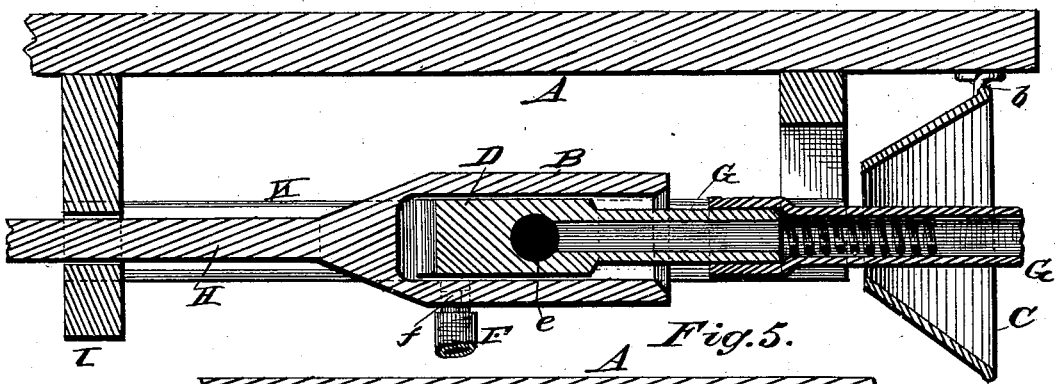
WITNESSES
INVENTOR
Peter G. Roquemore
per O. E. Duffy
Attorney
N. PETERS, Photo-Lithographer, Washington, D. C.

UNITED STATES PATENT OFFICE.

PETER G. ROQUEMORE, OF MARSHALL, TEXAS, ASSIGNOR OF ONE-HALF TO J. H. THOMPSON, OF SAME PLACE.

AUTOMATIC AIR-BRAKE COUPLING.

SPECIFICATION forming part of Letters Patent No. 407,839, dated July 30, 1889.

Application filed June 22, 1887. Serial No. 242,157. (No model.)

*To all whom it may concern:*

Be it known that I, PETER G. ROQUEMORE, of Marshall, in the county of Harrison and State of Texas, have invented certain new and useful Improvements in Automatic Couplings for Air-Brakes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to couplings for air and steam brakes which are well known as the "Westinghouse" and other brakes of like character, and has for its object to automatically couple and uncouple when cars are brought together and detached.

Heretofore air and steam brake couplings had to be operated by hand, and in a few instances attempts have been made to automatically couple and uncouple them, with more or less success; but to such old devices, however, I make no claim.

A further object of my invention is to provide an improved automatic pipe-coupling which shall overcome the difficulties found in the devices of this class heretofore in use, and which shall be cheap to manufacture, easy to repair, simple in construction, and extremely effective in use and operation.

A further object is to provide an automatic air-brake coupling in which a sliding coupling-head connected with a main conduit or pipe is used in connection with a coupling or hose-head carried by one end of a main conduit, and which is adapted to enter and be removably locked in a locking-socket in the sliding coupling-head, whereby the portion of the conduit connected with the sliding head is detachably held in communication with the portion of the conduit which carries the hose-head.

A further object is to provide the sliding coupling-head with a locking-socket and an improved locking device carried by said head and operated by a guide bearing upon a guide track or rod, and a coupling or hose head adapted to enter said locking-socket and be removably held in the same by the locking device; and a further object is to provide improved means for supporting and guiding the sliding coupling-head in its operation, and to provide certain details of construction whereby the whole device is connected and rendered more simple and effective in operation.

With these ends in view my invention consists in certain novel features of construction and combinations of parts more fully described hereinafter, and particularly pointed out in the claims.

Figure 2:
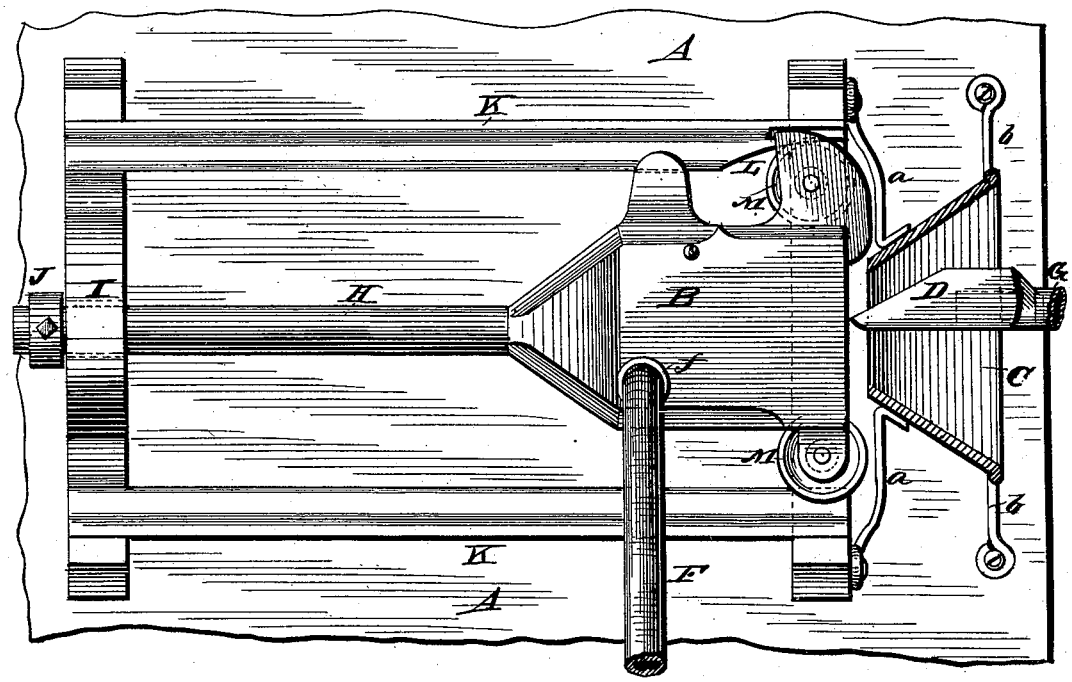

Figure 1 of the drawings represents a top plan view of two of my couplings, which are secured to the bottoms of the car-platforms, and in that case would be inverted. They are shown on opposite sides of the cars, so that when the cars are turned end for end or in a reversed position the couplings will register. I prefer to locate the couplings near the side of the cars for more ready access and to avoid the danger of getting between the cars in case of accident, and, furthermore, the couplings are out of the way of the draw-heads and bars. Fig. 2 is an enlarged view of the coupling, partly in section, showing the hose-head in the flaring guide or mouthpiece outside of and attached to the coupling-head for that purpose. Fig. 3 is a horizontal section showing all the parts in an operative position. Fig. 4 is a vertical longitudinal section taken on line $x\,x$ of Fig. 3, showing how the coupling is secured to the car-bottom. Fig. 5 is an end or face view of the coupling, partly in section, taken on the line $y\,y$ of Fig. 3; and Fig. 6 shows one modification of the coupling-head with the anti-friction rollers omitted.

The same letters will indicate corresponding parts in all the figures, in which—

A is the bottom of the car in an inverted position, and B the sliding coupling-head.

C is the mouth-guide, and D the coupling or hose head.

E is the main conduit or hose, and F the connection to the coupling for any particular use.

G is the hose-pipe, which carries the hose-head D of each individual car.

H is the central guide-rod working in the yoke I, having on its end a stop J.

K K are guide-rods of ordinary T-shaped iron in cross-section. They may be made of any approved design, so that one may be cut away at the entering end of the valve-head to form a releasing portion, as shown at L.

M M are anti-friction rollers, which work on the guides K, and a a are brackets for holding the flaring or funnel-shaped mouth-piece C to the frame of the coupling, and b b are braces for staying the mouth-pieces in position.

N shows the ordinary draw-head of the car, which shows the relative position of the couplings on the car.

Referring more particularly to Sheet 2, Fig. 3, it will be seen that within the head B the socket-chamber O is formed, and in which is located a spring clutching device P, carrying spring c. The device P is pivoted to the head B. The outer end of the piece P carries one of the anti-friction rollers M, which, when it reaches the recess or cut-away portions L of the guide K, will be forced into said recess by the resiliency of the spring c, and thereby release the hose-head D. When, however, the coupling is in the position shown in Fig. 3, the projection on the head D fits into the depression on piece P and the projection on P fits into the depression on D, so that they rigidly interlock and operate as if they were made out of a solid piece.

Upon one side of the coupling I form a lug or projection, which, with the rod H, prevents any lateral motion or twisting of the coupling-head, while the anti-friction rollers carry the coupling smoothly on the guides. On the opposite side of the socket O is formed the air or steam chamber d, which is provided with two apertures or ports e f, e being inside of the socket and f on the outside for hose-connection F.

The port e has a countersink or recess, in which is placed a rubber gasket or other packing, and a like recess is formed in the face of the hose-head D, in which is also placed a like gasket or packing, so that when the hose-head D is pushed into the socket O these two gaskets form a perfectly air-tight joint. Thus the air or steam passing through the hose or valve head D and through the coupling is prevented from escaping. Of course when the coupling assumes the position shown in Fig. 2 the hose-head D is perfectly released, for the portion P is thrown back into the recess L by the resiliency of the spring c.

It will be seen that by this construction of coupling no special attention need be paid to it when the cars are coupled or uncoupled. When the cars are brought together, the hose-head enters the socket and becomes locked as the coupling is forced back on the guide-rods, and when the cars are uncoupled and move away from each other the coupling-head will be drawn forward till the wheel on the clutching device will be released and the hose-head can be drawn out of the socket.

The conduit-hose connected immediately to the coupling-head D should be provided with coiled wire on its inner side, so that it will be sufficiently stiff to support the head and guide it into the flaring mouth-piece, and at the same time be sufficiently flexible to yield to any irregular motion of the cars. This coupling may be adapted to hose generally in mines and other places, if so desired.

It is evident that many modifications can be made and the various parts be differently arranged without departing from the spirit of my invention. Therefore I do not desire to be confined to the exact form shown; but I claim, broadly, an automatic hose-coupling adapted to slide on guideways embodying substantially the method shown and described.

Having thus fully described my invention, what I claim, and desire to secure by Letters Patent of the United States, is—

1. The combination, in a pipe-coupling, of guide tracks or rods, a sliding coupling-head supported between and provided with guides operating upon said tracks or rods, a coupling or hose head, and a locking-latch whereby the hose-head is removably coupled to the sliding head, substantially as described.

2. In a hose or pipe coupling, the combination of guide tracks or rods, a sliding coupling-head provided with lateral guides operating upon said tracks or rods, a stationary yoke, a guide upon the coupling-head working in said yoke, a coupling or hose head adapted to engage the sliding head, and a latch carried by the sliding head, whereby the hose-head is removably locked to the sliding head, substantially as described.

3. The combination, in a pipe or hose coupling, of guide tracks or rods, a sliding coupling-head supported between said tracks or rods and provided with a locking-socket, a coupling or hose head adapted to enter said locking-socket, and a locking device to removably hold said hose-head in said socket, substantially as described.

4. In combination, guide tracks or rods, a sliding coupling-head supported between and having lateral guides operating upon said tracks or rods and provided with a locking-socket and coupling-latch bearing upon one of said tracks, and a coupling or hose head adapted to enter said socket and provided with a shoulder with which said latch engages, substantially as described.

5. In combination, guide tracks or rods, a sliding coupling-head supported between and operating upon said tracks or rods, a latch pivoted to said sliding head and bearing upon one of said tracks, and a coupling or hose head adapted to engage said sliding head, substantially as described.

6. The combination, in a hose or pipe coupling, with a sliding coupling-head provided with a locking-socket, a steam or air chamber communicating with the locking-socket, and a coupling-latch pivoted to the sliding coupling-head, of a hollow coupling or hose head adapted to be removably held in the locking-socket in communication with said chamber by the coupling-latch, substantially as described.

7. The combination, in a hose or pipe coupling, with guide tracks or rods one of which is provided with a recess, a sliding coupling-head, lateral guides carried by said sliding head and operating upon the tracks or rods, and a spring-actuated latch adapted to slide on the recessed track or rod, of a coupling or hose head adapted to engage the sliding head and be removably locked to the same by said latch, substantially as described.

8. In combination, a supporting-frame, a flaring mouth attached to the same, a sliding coupling-head, a spring-actuated latch pivoted to the sliding head, and a coupling or hose head adapted to engage the sliding head and be removably locked to the same by said latch, substantially as described.

9. In combination, a sliding coupling-head having a locking-socket and a steam or air chamber provided with inlet and outlet ports, one of said ports opening into the locking-socket, a spring-actuated locking-latch pivoted to the sliding head, and a hollow coupling or hose head adapted to enter and be removably held in the locking-socket by said latch, said hose-head being provided with a port which registers with the port from the steam or air chamber which opens into the locking-socket when the parts are locked together, substantially as described.

10. The combination, with a supporting-frame, a sliding coupling-head operating in said frame, a spring-actuated locking device pivoted to the sliding head, and a flaring mouth carried by the frame, of a coupling or hose head, the main conduit or hose, and the conduit or hose connecting the main conduit with the sliding head, substantially as described.

11. The combination, in an automatic pipe or hose coupling, with a sliding coupling-head provided with anti-friction guides and with an internal steam-chamber having induction and eduction ports and an automatic locking device, of a hose or coupling head adapted to engage the sliding head and guide tracks or rods between which the sliding coupling-head is supported and upon which the anti-friction guides operate, substantially as described.

12. In combination, guide tracks or rods, a sliding coupling-head operating upon said tracks or rods and provided with a locking-socket, a main pipe or conduit, a coupling or hose head carried by an end of the pipe or conduit and adapted to enter the locking-socket of the sliding coupling-head, and a locking device bearing upon one of said guide tracks or rods and adapted to removably hold the hose-head in the locking-socket, substantially as described.

13. In combination, guide tracks or rods, a sliding coupling-head supported between and operating upon said tracks or rods and provided with a locking-socket and a steam or air chamber in communication with the locking-socket, a main conduit or hose communicating with said steam or air chamber, a coupling or hose head carried by an end of the main conduit or hose and adapted to enter the locking-socket in the sliding coupling-head, and a locking-latch sliding upon one of said guide tracks or rods, whereby the hose-head is removably held in the locking-socket, substantially as described.

14. In combination, a supporting-frame, a sliding coupling-head operating therein and provided with a locking-socket having a port, a conduit or pipe communicating with the port opening into the locking-socket, a coupling or hose-head adapted to enter the locking-socket, said hose-head being provided with a shoulder upon one side and a port upon another side to register with said port in the locking-socket, and a latch to engage said shoulder and removably hold the hose-head in the locking-socket, substantially as described.

15. In combination, guide tracks or rods, a sliding coupling-head supported between and operating upon said tracks or rods and provided with a locking-socket, a locking device carried by the coupling-head, a guide carried by the locking device and bearing upon one of said tracks or rods and by which the locking device is operated, and a coupling or hose head adapted to enter the locking-socket and be removably locked in the same by said locking device, substantially as described.

In testimony that I claim the foregoing as my own I affix my signature in presence of two witnesses.

P. G. ROQUEMORE.

Witnesses:
 JOHN E. HALLETT,
 E. CRUSE.